Patented May 16, 1939

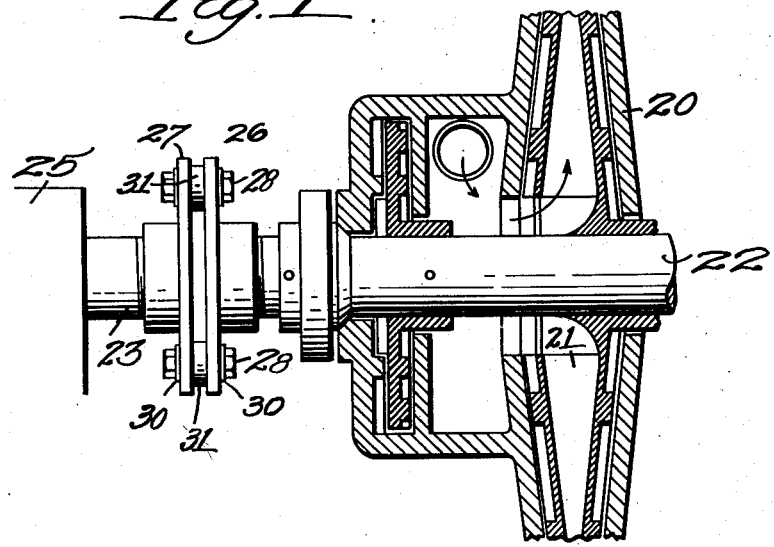
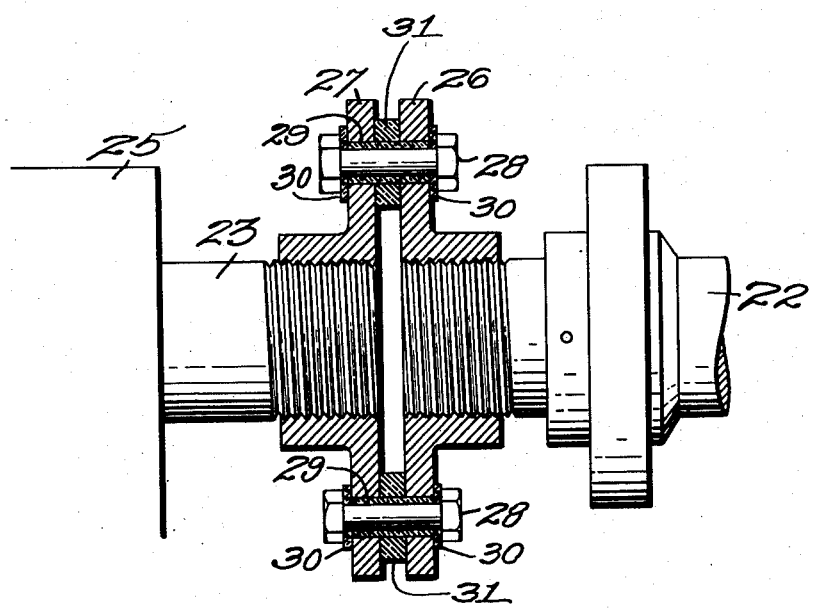

2,158,182

UNITED STATES PATENT OFFICE 2,158,182

HEAT INSULATING COUPLING

Robert H. Goddard, Roswell, N. Mex.

Original application August 31, 1934, Serial No. 742,251, now Patent No. 2,127,865, dated August 23, 1938. Divided and this application December 20, 1937, Serial No. 180,783

1 Claim. (Cl. 287—129)

This application is a division of my prior application Serial No. 742,251, filed August 31, 1934, now Patent No. 2,127,865 of August 23, 1938, which application relates to centrifugal pumps and particularly to pumps designed for handling low-temperature liquids, such as liquid air, at or near their very low boiling points.

In pumps designed for such purposes, it is desirable to prevent any substantial transfer of heat between the pump and the bearings of the supporting or driving shafts. If heat is transferred from the bearings to the pump, low temperature operations may be disturbed, and if the bearings are excessively cooled, lubrication of the bearings will be less effective.

It is the object of my invention as defined in this divisional application to provide an improved heat-insulating coupling adapted for general application and particularly designed for use in low-temperature pumping apparatus.

My invention further relates to arrangements and combinations of parts which will be hereinafter described and more particularly pointed out in the appended claim.

A preferred form of the invention is shown in the drawing, in which

Fig. 1 is a front elevation of my improved coupling, with portions of an associated centrifugal pump shown in section, and Fig. 2 is an enlarged sectional front elevation of the coupling.

Referring particularly to Fig. 1, I have shown a portion of a centrifugal pump comprising a casing 20, an enclosed impeller 21, an impeller shaft 22, and a supporting or driving shaft 23 for said impeller, said shaft 23 being rotatably mounted in a bearing 25.

For the purpose of preventing heat transfer between the shafts 22 and 23, these shafts are connected by a special heat-insulating coupling constructed as follows:

A disc 26 is threaded on one end of the impeller shaft 22 and a similar disc 27 is threaded on the adjacent end of the supporting shaft 23. The discs 26 and 27 are connected by circumferentially spaced bolts 28, each provided with a sleeve 29, washers 30 and a collar 31, all of suitable non-conducting and heat-insulating material. By this construction any transfer of heat generated by the shaft 23 in its bearing 25 to the impeller shaft 22 is prevented, and excessive cooling of the bearing 25 by the low temperature liquid in the pump is also prevented.

If a second supporting or driving shaft and bearing are used at the opposite side of the pump, a second coupling of similar heat-insulating construction will be provided.

A centrifugal pump may thus be rendered capable of pumping liquids having very low boiling points and at temperatures much below the temperature of the atmosphere in which the pump operates.

Attention is particularly called to the fact that all metal-to-metal contact between the bolts 28 and the discs 26 and 27 is avoided, which is a matter of great importance. If any of the insulating members 29, 30 or 31 are omitted, so metal-to-metal contact is established, heat will be transferred through such contact.

The advantages of the invention may be in part retained if the bolts 28 are heat-insulated from one flange 26 or 27 only, but insulation of the bolts 28 from both flanges as described has been found more efficient and satisfactory.

Having thus described my invention and the advantages thereof, I do not wish to be limited to the details herein disclosed, otherwise than as set forth in the claim, but what I claim is:

A heat-insulating driving coupling for connecting adjacent co-axial rotating members comprising a disc mounted on the end of one rotating member, a second disc mounted on the adjacent end of the second rotating member but spaced from said first member, clamping bolts connecting said discs, and heat-insulating means for said bolts and discs comprising sleeves for said bolts in said discs, spacing collars between said discs and concentric with said bolts and sleeves, and washers between the ends of said bolts and said discs, said sleeves, collars and washers all being of heat-insulating material and each sleeve extending through both discs and through an interposed collar.

ROBERT H. GODDARD.